US012782513B2

(12) United States Patent
Ji et al.

(10) Patent No.: US 12,782,513 B2
(45) Date of Patent: Nov. 3, 2026

(54) FILTERING METHOD FOR TWO-DIMENSIONAL LASER POINT CLOUD, MOBILE ROBOT AND COMPUTER-READABLE STORAGE MEDIUM

(71) Applicant: UBTECH ROBOTICS CORP LTD, Shenzhen (CN)

(72) Inventors: Jiahao Ji, Shenzhen (CN); Jichao Jiao, Shenzhen (CN); Simin Zhang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 260 days.

(21) Appl. No.: 18/909,874

(22) Filed: Oct. 8, 2024

(65) Prior Publication Data

US 2025/0199122 A1 Jun. 19, 2025

(30) Foreign Application Priority Data

Dec. 13, 2023 (CN) ........................ 202311713217.2

(51) Int. Cl.

| | |
|---|---|
| ***G01S 7/48*** | (2006.01) |
| ***G01S 17/89*** | (2020.01) |
| ***G05D 1/246*** | (2024.01) |
| ***G05D 105/10*** | (2024.01) |
| ***G05D 111/10*** | (2024.01) |
| ***G05D 111/50*** | (2024.01) |

(52) U.S. Cl.

CPC ................ *G01S 7/48* (2013.01); *G01S 17/89* (2013.01); *G05D 1/246* (2024.01); *G05D 2105/10* (2024.01); *G05D 2111/17* (2024.01); *G05D 2111/52* (2024.01)

(58) Field of Classification Search

CPC .......... G01S 7/48; G01S 17/89; G01S 7/4808; G01S 17/06; G01S 7/495; G05D 1/246; G05D 2105/10; G05D 2111/17; G05D 2111/52

See application file for complete search history.

(56) References Cited

U.S. PATENT DOCUMENTS

2020/0215690 A1* 7/2020 Wang ....................... B25J 9/163
2020/0331143 A1* 10/2020 Wang ..................... B25J 9/1664

* cited by examiner

*Primary Examiner* — Seung C Sohn

(57) ABSTRACT

A filtering method for a two-dimensional laser point cloud includes: acquiring a pitch angle and a roll angle of a mobile robot when the mobile robot is collecting a two-dimensional laser point cloud; determining a target tilt direction corresponding to the mobile robot and a target tilt angle corresponding to the two-dimensional laser point cloud according to the pitch angle and the roll angle; determining an angular filtering interval according to the target tilt direction and the target tilt angle, wherein the angular filtering interval is an angle interval corresponding to the laser point cloud to be filtered out; and filtering, by the mobile robot, the two-dimensional laser point cloud based on the angular filtering interval.

20 Claims, 4 Drawing Sheets

FILTERING METHOD FOR TWO-DIMENSIONAL LASER POINT CLOUD, MOBILE ROBOT AND COMPUTER-READABLE STORAGE MEDIUM

CROSS REFERENCE TO RELATED APPLICATIONS

This application claims priority to Chinese Patent Application No. CN 202311713217.2, filed Dec. 13, 2023, which is hereby incorporated by reference herein as if set forth in its entirety.

TECHNICAL FIELD

The present disclosure generally relates to mobile robots, and in particular relates to a filtering method for a two-dimensional laser point cloud, mobile robot and computer-readable storage medium.

BACKGROUND

Two-dimensional (2D) lasers are typically used for mapping and localization in mobile robots, such as in small commercial cleaning robots or household cleaning robots. When the robot tilts, part of the 2D laser point clouds may hit the floor. If local features formed by these 2D laser point clouds hitting the floor are used for matching with the global map, it can cause localization errors. Therefore, filtering out these 2D laser point clouds that hit the floor due to tilting to reduce localization errors has become an urgent problem to be solved in this field.

Therefore, there is a need to provide a method for filtering a two-dimensional laser point cloud to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
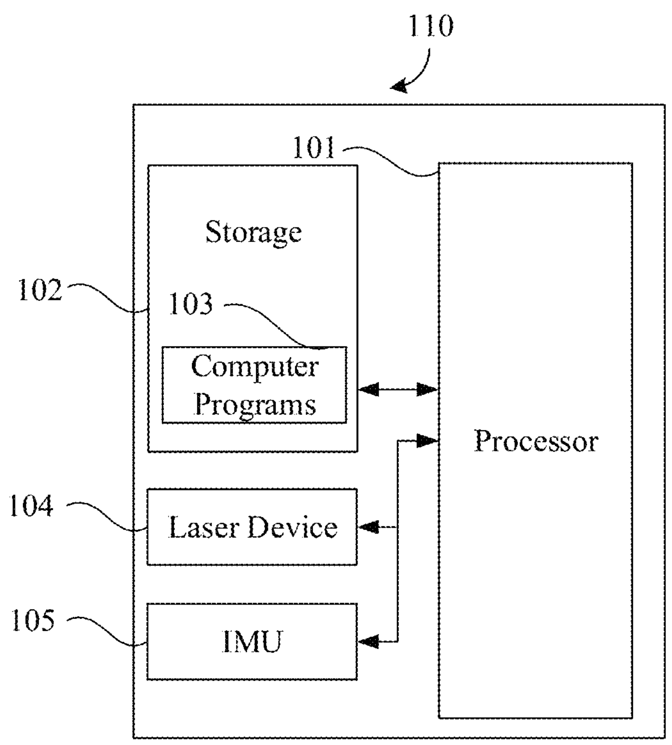
FIG. 1 is a schematic block diagram of a mobile robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Two-dimensional (2D) lasers are typically used for mapping and localization in mobile robots, such as in small commercial cleaning robots or household cleaning robots. When the robot tilts, part of the 2D laser point clouds may hit the floor. If local features formed by these 2D laser point clouds hitting the floor are used for matching with the global map, it can cause localization errors, leading to map overlay issues. To avoid localization errors and prevent map overlay problems, it is necessary to filter out these laser point clouds that hit the floor due to tilting.

Some conventional methods for filtering out laser point clouds that hit the floor are generally applied to 3D laser point clouds, using height information from the 3D laser point clouds for filtering. However, 2D laser point clouds are different from 3D laser point clouds, as 2D laser point clouds do not have height information. This means that for 2D laser point clouds, it is not possible to filter out the laser point clouds that hit the floor due to tilting based on height information.

Therefore, how to filter out these 2D laser point clouds that hit the floor due to tilting in order to reduce localization errors has become an urgent problem to be solved in this field.

To address the above problem, the present disclosure provides a filtering method for a two-dimensional laser point cloud, along with a mobile robot and a computer-readable storage medium. According to the method, a pitch angle and a roll angle of a mobile robot are obtained when the mobile robot is collecting a two-dimensional laser point cloud. A target tilt direction corresponding to the mobile robot and a target tilt angle corresponding to the two-dimensional laser point cloud are then determined according to the pitch angle and the roll angle. An angular filtering interval is then determined according to the target tilt direction and the target tilt angle. The angular filtering interval is an angle interval corresponding to the laser point cloud to be filtered out. Then, the two-dimensional laser point cloud is filtered by the mobile robot based on the angular filtering interval. This can accurately filter out the 2D laser point cloud that hits the floor, retain other correct and effective laser point clouds, avoid mispositioning and map overlay caused by the 2D laser point cloud that hits the floor, and make it possible to use some correct and effective 2D laser point clouds for accurate positioning when the mobile robot is tilted, thereby offering strong usability and practicality.

The mobile robot can be, but are not limited to, a cleaning robot (e.g., smart vacuum cleaner, smart robot mop, window cleaning robot), a companion mobile robot (e.g., smart electronic pet, nanny robot), a service mobile robot (e.g., reception robot for hotels, motels, and meeting venues), an industrial inspection smart device (e.g., power inspection robot, smart forklift), and a security robot (e.g., household or commercial smart security robot). These examples of robots are provided for illustration purposes only and do not constitute any limitations.

Figure 2:
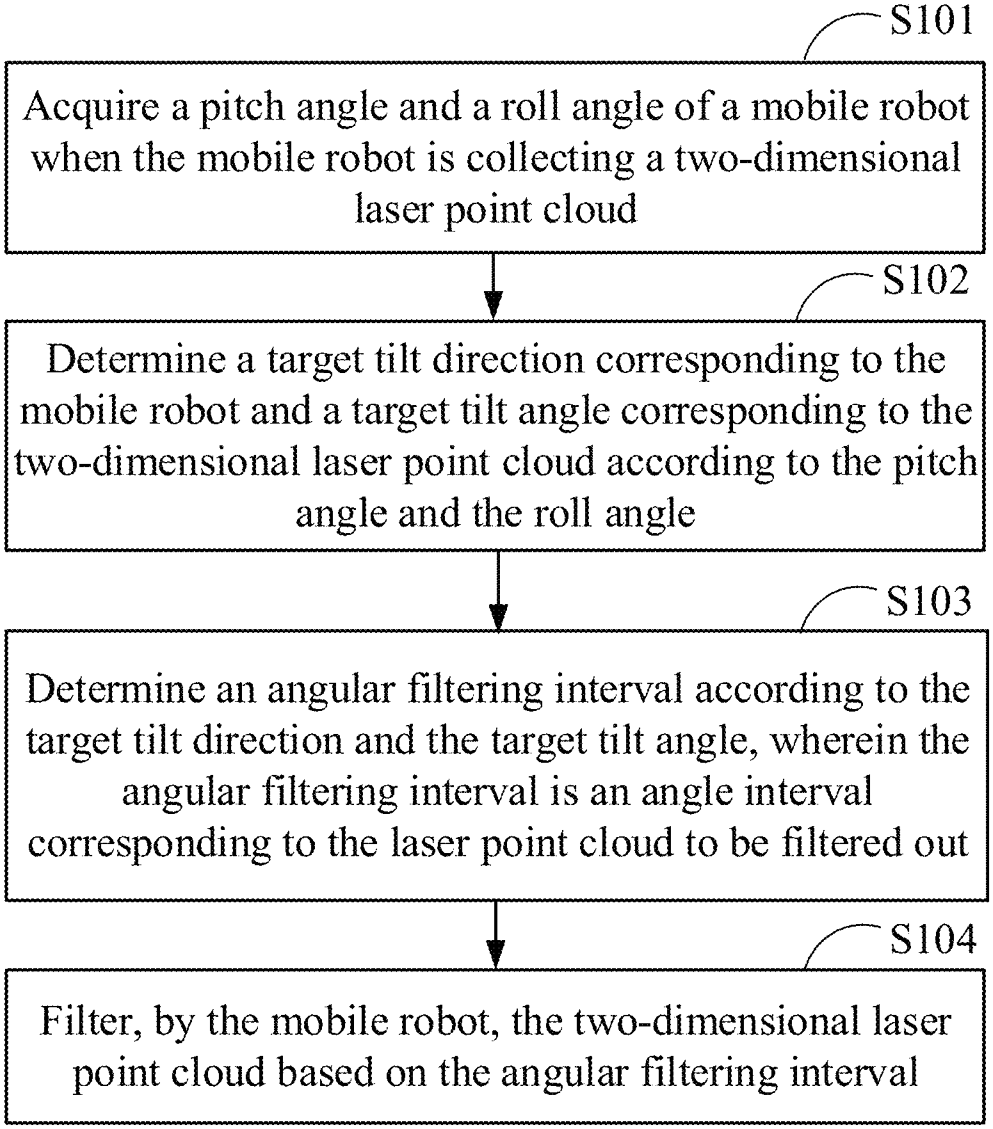
FIG. 2 is an exemplary flowchart of a filtering method for a 2D laser point cloud according to one embodiment.

FIG. 1 shows a schematic block diagram of a mobile robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for filtering a 2D laser point cloud, such as steps S101 to S104 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 4:
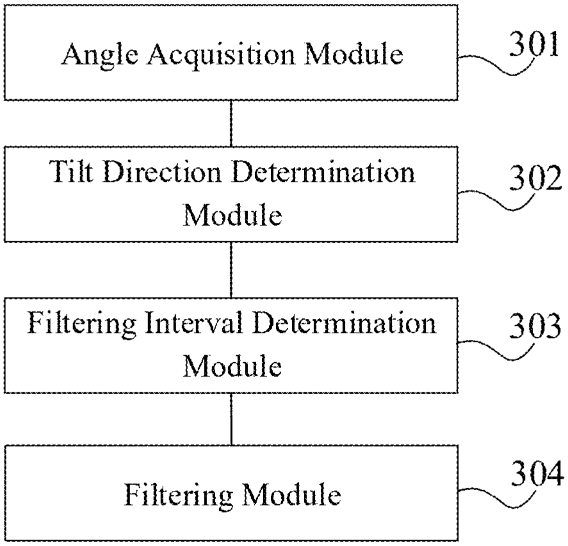
FIG. 4 is a schematic block diagram of a filtering device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into an angle acquisition module 301, a tilt direction determination module 302, a filtering interval determination module 303 and a filtering module 304 as shown in FIG. 4.

In one embodiment, the mobile robot may further include a laser device 104 and an inertial measurement unit 105. The laser device 104 is to emit 2D laser beams and collect 2D laser point clouds, while the inertial measurement unit (IMU) 105 is to obtain the pitch and roll angles of the mobile robot during the collection of 2D laser point clouds.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a filtering method for a two-dimensional laser point cloud according to one embodiment. As an example, but not a limitation, the method can be implemented by the robot 110. The method may include the following steps.

Step S101: Acquire a pitch angle and a roll angle of a mobile robot when the mobile robot is collecting a two-dimensional laser point cloud.

In one embodiment, the robot can collect 2D laser point clouds using the laser device (e.g., a LiDAR). The robot can use the IMU (Inertial Measurement Unit) to obtain the pitch and roll angles while collecting 2D laser point clouds.

After the pitch and roll angles are obtained during the collection of the 2D laser point cloud, the pitch and roll angles can be transformed into the base coordinate system (base_link) of the robot. Similarly, after the two-dimensional laser point cloud collected by the robot is obtained, the two-dimensional laser point cloud can be converted to the base coordinate system of the robot to perform filtering processing of the two-dimensional laser point cloud according to the pitch angle, roll angle and two-dimensional laser point cloud converted to the base coordinate system of the robot.

It can be understood that the base coordinate system of the robot can be determined according to the actual scenario, and the present disclosure does not impose any restrictions on this. For example, the base coordinate system can be a coordinate system established with the center point of the robot as the origin. The positive direction of the x-axis of the base coordinate system points towards the robot's forward direction. The y-axis of the base coordinate system points upward in the vertical direction. The z-axis of the base coordinate system points toward the right side of the robot. Similarly, the specific approach for converting the pitch angle, roll angle, and 2D laser point cloud into the base coordinate system of the robot can be determined based on the actual scenario, and the present disclosure imposes no restrictions on it.

Step S102: Determine a target tilt direction corresponding to the mobile robot and a target tilt angle corresponding to the two-dimensional laser point cloud according to the pitch angle and the roll angle.

In one embodiment, the target tilt direction corresponding to the robot may be the maximum tilt direction when the robot collects the two-dimensional laser point cloud. The tilt direction is characterized by an angle. For example, the tilt direction may be represented by π/4, π/3, −π/4, or −π/3.

In one embodiment, the tilt of the robot generally refers to its tilt in the vertical direction. That is, the target tilt direction corresponding to the robot can be the tilt angle of the robot in the vertical direction.

In one embodiment, when the laser angles are arranged in the range of [−π, π], the robot can determine the target tilt direction using the following equation:

$$\text{angle\_tilt} = \begin{cases} \arccos\left(\dfrac{\text{roll}}{\sqrt{\text{roll}^2 + \text{pitch}^2}}\right), & \text{pitch} > 0 \\ -\arccos\left(\dfrac{\text{roll}}{\sqrt{\text{roll}^2 + \text{pitch}^2}}\right), & \text{pitch} \le 0 \end{cases},$$

where angle_tilt represents the target tilt direction, pitch represents the pitch angle when the robot collects the two-dimensional laser point cloud, and roll represents the roll angle when the robot collects the two-dimensional laser point cloud.

In another embodiment, when the laser angles are arranged in the range of [π, −π], the robot can determine the target tilt direction using the following equation:

$$\text{angle\_tilt} = \begin{cases} -\arccos\left(\frac{\text{roll}}{\sqrt{\text{roll}^2+\text{pitch}^2}}\right), & \text{pitch} > 0 \\ \arccos\left(\frac{\text{roll}}{\sqrt{\text{roll}^2+\text{pitch}^2}}\right) & \text{pitch} \le 0 \end{cases}.$$

In one embodiment, the target tilt angle corresponding to the two-dimensional laser point cloud can be the maximum angle of the two-dimensional laser point cloud collected by the laser device in the robot when the robot is in a tilted state.

In one embodiment, the robot can determine the target tilt angle corresponding to the two-dimensional laser point cloud using the following equation: tilt=arccos(cos(pitch)×cos(roll)).

Step S103: Determine an angular filtering interval according to the target tilt direction and the target tilt angle, wherein the angular filtering interval is an angle interval corresponding to the laser point cloud to be filtered out.

In one embodiment, the robot may determine the tilt angle threshold in advance to determine whether the 2D laser point cloud needs to be filtered out based on the tilt angle threshold and the target tilt angle.

In one embodiment, when the target tilt angle is greater than the tilt angle threshold, the robot may determine that the robot has a large tilt degree, and at this time, the robot may determine that filtering is necessary for the 2D laser point cloud. When the target tilt angle is less than or equal to the tilt angle threshold, the robot may determine that the robot has a small tilt degree, and at this time, the robot may determine that filtering is not required for the 2D laser point cloud.

In other words, after determining the target tilt angle, the robot can first decide whether filtering is necessary for the 2D laser point cloud based on the target tilt angle and the tilt angle threshold. When it is determined that filtering is required for the 2D laser point cloud, the robot can determine the angular filtering interval based on the target tilt direction and the target tilt angle, and use this interval to perform the filtering. If it is determined that filtering is not required, the robot does not need to determine the angular filtering interval.

In one embodiment, the laser device in the robot can be a horizontally mounted laser device. In this case, the robot can determine the tilt angle threshold corresponding to the two-dimensional laser point cloud based on the installation height corresponding to the laser device and the maximum distance corresponding to the laser device.

It should be understood that the installation height may refer to the distance between the laser device and the lowest point of the robot. For example, when the robot is located on the ground, the lowest point of the robot may fall on the ground. In this case, the installation height corresponding to the laser device may refer to the distance between the laser device and the ground. The maximum distance corresponding to the laser device may refer to the maximum range of the laser device, that is, the largest distance that the laser can reach.

In one embodiment, the robot can determine the tilt angle threshold corresponding to the laser point cloud using the following equation:

$$\text{tilt\_min} = \arcsin\left(\frac{\text{h\_laser}}{\text{range\_max}}\right),$$

where h_laser represents the installation height corresponding to the laser device, measured in meters (m), and range_max represents the maximum distance corresponding to the laser device.

In one embodiment, the robot can first determine the first angle based on the target tilt direction, the target tilt angle, and the tilt angle threshold. Then, the robot can determine the angular filtering interval based on the first angle and the target tilt direction.

In one embodiment, the robot can determine the angular filtering interval as (target tilt direction-first angle, target tilt direction+first angle).

In one embodiment, the first angel can be calculated using the following equation:

$$\theta = \frac{\text{tilt} - \text{tilt\_min}}{\text{tilt}} \times \text{angle\_tilt},$$

where θ represents the first angle, tilt represents the target tilt angle, tilt_min represents the tilt angle threshold, and angle_tilt represents the target tilt direction.

FIG. 2 shows a schematic diagram of an application scenario according to one embodiment. This application scenario is exemplified using the laser angle range of [π, −π] as an example for illustrative purposes. In the application scenario, the base coordinate system of the robot can be a coordinate system established with the center point of the robot as the origin. The positive direction of the x-axis of the base coordinate system points towards the robot's forward direction. The y-axis of the base coordinate system points upward in the vertical direction. The z-axis of the base coordinate system points toward the right side of the robot.

Figure 3:
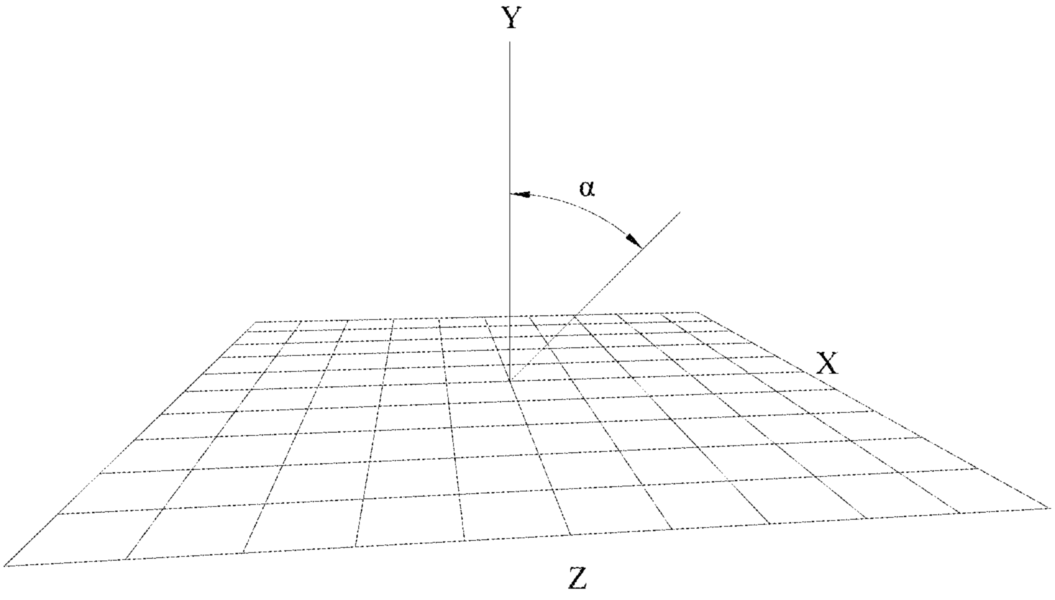
FIG. 3 is a schematic diagram of an application scenario according to one embodiment.

Assuming that both the pitch and roll angles are π/4 when the robot collects 2D laser point clouds, the robot can determine, based on the equation angle_tilt=

$$\begin{cases} -\arccos\left(\frac{\text{roll}}{\sqrt{\text{roll}^2+\text{pitch}^2}}\right), & \text{pitch} > 0 \\ \arccos\left(\frac{\text{roll}}{\sqrt{\text{roll}^2+\text{pitch}^2}}\right), & \text{pitch} \le 0 \end{cases}$$

that the target tilt direction is π/4, meaning the robot's angle relative to the vertical direction is π/4. In other words, as shown in FIG. 3, when the robot collects 2D laser point clouds, the robot is tilted 45° in the forward direction, and the "α" in FIG. 3 indicates this 45° angle.

Assuming the robot determines the first angle θ to be 20° based on the target tilt direction, target tilt angle, and the tilt angle threshold, the robot can determine the angular filtering interval as (45°−20°, 45°+20°), meaning the angular filtering interval can be (25°, 65°).

Step S104: Filter, by the mobile robot, the two-dimensional laser point cloud based on the angular filtering interval.

After determining the angular filtering interval, the robot can identify the angle corresponding to each 2D laser point cloud. It can then detect which 2D laser point cloud fall within the angular filtering interval and filter out the point cloud. For example, the range of the 2D laser point clouds within the angular filtering interval can be set to 0, thereby filtering out the 2D laser point clouds that hit the floor due to tilting.

For example, when the angular filtering interval is (25°, 65°), the robot can identify all 2D laser point clouds with angles within this range and filter out these point clouds. This process results in filtering out the 2D laser point clouds that hit the ground due to the robot's tilt.

According to the method discussed above, a pitch angle and a roll angle of a mobile robot are obtained when the mobile robot is collecting a two-dimensional laser point cloud. A target tilt direction corresponding to the mobile robot and a target tilt angle corresponding to the two-dimensional laser point cloud are then determined according to the pitch angle and the roll angle. An angular filtering interval is then determined according to the target tilt direction and the target tilt angle. The angular filtering interval is an angle interval corresponding to the laser point cloud to be filtered out. Then, the two-dimensional laser point cloud is filtered by the mobile robot based on the angular filtering interval. This can accurately filter out the 2D laser point cloud that hits the floor, retain other correct and effective laser point clouds, avoid mispositioning and map overlay caused by the 2D laser point cloud that hits the floor, and make it possible to use some correct and effective 2D laser point clouds for accurate positioning when the mobile robot is tilted.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

Corresponding to the method described in the above embodiments, FIG. 4 illustrates a block diagram of a filtering device according to one embodiment. For the sake of clarity, only the relevant parts are shown.

In one embodiment, the filtering device may include an angle acquisition module 301, a tilt direction determination module 302, a filtering interval determination module 303 and a filtering module 304. The angle acquisition module 301 is to acquire a pitch angle and a roll angle of a mobile robot when the mobile robot is collecting a two-dimensional laser point cloud. The tilt direction determination module 302 is to determine a target tilt direction corresponding to the mobile robot and a target tilt angle corresponding to the two-dimensional laser point cloud according to the pitch angle and the roll angle. The filtering interval determination module 303 is to determine an angular filtering interval according to the target tilt direction and the target tilt angle, wherein the angular filtering interval is an angle interval corresponding to the laser point cloud to be filtered out. The filtering module 304 is to filter, by the mobile robot, the two-dimensional laser point cloud based on the angular filtering interval.

In one embodiment, the filtering interval determination module 303 is to: determine a tilt angle threshold corresponding to the two-dimensional laser point cloud; and in response to the target tilt angle being greater than the tilt angle threshold, determine the angular filtering interval according to the target tilt direction and the target tilt angle.

In one embodiment, the mobile may include a laser device. The filtering interval determination module 303 is further to: obtain a height corresponding to the laser device and a maximum distance corresponding to the laser device and determine the tilt angle threshold corresponding to the two-dimensional laser point cloud according to the height and the maximum distance corresponding to the laser device.

In one embodiment, the filtering interval determination module 303 is further to: determine a first angle according to the target tilt direction, the target tilt angle and the tilt angle threshold and determine the angular filtering interval according to the first angle and the target tilt direction.

In one embodiment, the target tilt direction is characterized by an angle. The filtering interval determination module 303 is further to calculate the first angle according to the following equation:

$$\theta = \frac{\text{tilt} - \text{tilt\_min}}{\text{tilt}} \times \text{angle\_tilt},$$

where θ represents the first angle, tilt represents the target tilt angle, tilt_min represents the tilt angle threshold, and angle_tilt represents the target tilt direction.

In one embodiment, the tilt direction determination module 302 is further to determine the target tilt direction according to the following equation: angle_tilt=

$$\begin{cases} \arccos\left(\frac{\text{roll}}{\sqrt{\text{roll}^2 + \text{pitch}^2}}\right), & \text{pitch} > 0 \\ -\arccos\left(\frac{\text{roll}}{\sqrt{\text{roll}^2 + \text{pitch}^2}}\right) & \text{pitch} \leq 0 \end{cases},$$

where angle_tilt represents the target tilt direction, pitch represents the pitch angle, and roll represents the roll angle.

In one embodiment, the tilt direction determination module 302 is further to calculate the target tilt angle according to the following equation: tilt=arccos(cos(pitch)×cos(roll)), where tilt represents the target tilt angle.

Each unit in the device discussed above may be a software program module, or may be implemented by different logic circuits integrated in a processor or independent physical components connected to a processor, or may be implemented by multiple distributed processors.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. In addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented filtering method for a two-dimensional laser point cloud, the method comprising:

acquiring a pitch angle and a roll angle of a mobile robot when the mobile robot is collecting a two-dimensional laser point cloud;

determining a target tilt direction corresponding to the mobile robot and a target tilt angle corresponding to the two-dimensional laser point cloud according to the pitch angle and the roll angle;

determining an angular filtering interval according to the target tilt direction and the target tilt angle, wherein the angular filtering interval is an angle interval corresponding to the laser point cloud to be filtered out; and filtering, by the mobile robot, the two-dimensional laser point cloud based on the angular filtering interval.

2. The method of claim 1, wherein determining the angular filtering interval according to the target tilt direction and the target tilt angle comprises:

determining a tilt angle threshold corresponding to the two-dimensional laser point cloud; and in response to the target tilt angle being greater than the tilt angle threshold, determining the angular filtering interval according to the target tilt direction and the target tilt angle.

3. The method of claim 2, wherein the mobile robot comprises a laser device, and determining the tilt angle threshold corresponding to the two-dimensional laser point cloud comprises:

obtaining a height corresponding to the laser device and a maximum distance corresponding to the laser device; and determining the tilt angle threshold corresponding to the two-dimensional laser point cloud according to the height and the maximum distance corresponding to the laser device.

4. The method of claim 2, wherein determining the angular filtering interval according to the target tilt direction and the target tilt angle comprises:

determining a first angle according to the target tilt direction, the target tilt angle and the tilt angle threshold; and determining the angular filtering interval according to the first angle and the target tilt direction.

5. The method of claim 4, wherein the target tilt direction is characterized by an angle, and the first angle is calculated according to the following equation $$\theta = \frac{\text{tilt} - \text{tilt\_min}}{\text{tilt}} \times \text{angle\_tilt},$$

where θ represents the first angle, tilt represents the target tilt angle, tilt_min represents the tilt angle threshold, and angle_tilt represents the target tilt direction.

6. The method of claim 1, wherein the target tilt direction is determined according to the following equation:

$$\text{angle\_tilt} = \begin{cases} \arccos\left(\dfrac{\text{roll}}{\sqrt{\text{roll}^2 + \text{pitch}^2}}\right), & \text{pitch} > 0 \\ -\arccos\left(\dfrac{\text{roll}}{\sqrt{\text{roll}^2 + \text{pitch}^2}}\right), & \text{pitch} \le 0 \end{cases},$$

where angle_tilt represents the target tilt direction, pitch represents the pitch angle, and roll represents the roll angle.

7. The method of claim 1, wherein the target tilt angle is calculated according to the following equation: tilt=arccos (cos(pitch)×cos(roll)), where tilt represents the target tilt angle.

8. A mobile robot comprising:

one or more processors; and a memory coupled to the one or more processors, the memory storing programs that, when executed by the one or more processors, cause performance of operations comprising:

acquiring a pitch angle and a roll angle of the mobile robot when the mobile robot is collecting a two-dimensional laser point cloud;

determining a target tilt direction corresponding to the mobile robot and a target tilt angle corresponding to the two-dimensional laser point cloud according to the pitch angle and the roll angle;

determining an angular filtering interval according to the target tilt direction and the target tilt angle, wherein the angular filtering interval is an angle interval corresponding to the laser point cloud to be filtered out; and filtering, by the mobile robot, the two-dimensional laser point cloud based on the angular filtering interval.

9. The mobile robot of claim 8, wherein determining the angular filtering interval according to the target tilt direction and the target tilt angle comprises:

determining a tilt angle threshold corresponding to the two-dimensional laser point cloud; and in response to the target tilt angle being greater than the tilt angle threshold, determining the angular filtering interval according to the target tilt direction and the target tilt angle.

10. The mobile robot of claim 9, further comprising a laser device, and determining the tilt angle threshold corresponding to the two-dimensional laser point cloud comprises:

obtaining a height corresponding to the laser device and a maximum distance corresponding to the laser device; and determining the tilt angle threshold corresponding to the two-dimensional laser point cloud according to the height and the maximum distance corresponding to the laser device.

11. The mobile robot of claim 9, wherein determining the angular filtering interval according to the target tilt direction and the target tilt angle comprises:

determining a first angle according to the target tilt direction, the target tilt angle and the tilt angle threshold; and determining the angular filtering interval according to the first angle and the target tilt direction.

12. The mobile robot of claim 11, wherein the target tilt direction is characterized by an angle, and the first angle is calculated according to the following equation:

$$\theta = \frac{\text{tilt} - \text{tilt\_min}}{\text{tilt}} \times \text{angle\_tilt},$$

where θ represents the first angle, tilt represents the target tilt angle, tilt_min represents the tilt angle threshold, and angle_tilt represents the target tilt direction.

13. The mobile robot of claim 8, wherein the target tilt direction is determined according to the following equation:

$$\text{angle\_tilt} = \begin{cases} \arccos\left(\frac{\text{roll}}{\sqrt{\text{roll}^2 + \text{pitch}^2}}\right), & \text{pitch} > 0 \\ -\arccos\left(\frac{\text{roll}}{\sqrt{\text{roll}^2 + \text{pitch}^2}}\right), & \text{pitch} \le 0 \end{cases},$$

where angle_tilt represents the target tilt direction, pitch represents the pitch angle, and roll represents the roll angle.

14. The mobile robot of claim 8, wherein the target tilt angle is calculated according to the following equation: tilt=arccos(cos(pitch)×cos(roll)), where tilt represents the target tilt angle.

15. A non-transitory computer-readable storage medium storing instructions that, when executed by at least one processor of a mobile robot, cause the at least one processor to perform a method, the method comprising:

acquiring a pitch angle and a roll angle of the mobile robot when the mobile robot is collecting a two-dimensional laser point cloud;

determining a target tilt direction corresponding to the mobile robot and a target tilt angle corresponding to the two-dimensional laser point cloud according to the pitch angle and the roll angle;

determining an angular filtering interval according to the target tilt direction and the target tilt angle, wherein the angular filtering interval is an angle interval corresponding to the laser point cloud to be filtered out; and filtering, by the mobile robot, the two-dimensional laser point cloud based on the angular filtering interval.

16. The non-transitory computer-readable storage medium of claim 15, wherein determining the angular filtering interval according to the target tilt direction and the target tilt angle comprises:

determining a tilt angle threshold corresponding to the two-dimensional laser point cloud; and in response to the target tilt angle being greater than the tilt angle threshold, determining the angular filtering interval according to the target tilt direction and the target tilt angle.

17. The non-transitory computer-readable storage medium of claim 16, wherein the mobile robot comprises a laser device, and determining the tilt angle threshold corresponding to the two-dimensional laser point cloud comprises:

obtaining a height corresponding to the laser device and a maximum distance corresponding to the laser device; and determining the tilt angle threshold corresponding to the two-dimensional laser point cloud according to the height and the maximum distance corresponding to the laser device.

18. The non-transitory computer-readable storage medium of claim 16, wherein determining the angular filtering interval according to the target tilt direction and the target tilt angle comprises:

determining a first angle according to the target tilt direction, the target tilt angle and the tilt angle threshold; and determining the angular filtering interval according to the first angle and the target tilt direction.

19. The non-transitory computer-readable storage medium of claim 18, wherein the target tilt direction is characterized by an angle, and the first angle is calculated according to the following equation:

$$\theta = \frac{\text{tilt} - \text{tilt\_min}}{\text{tilt}} \times \text{angle\_tilt},$$

where θ represents the first angle, tilt represents the target tilt angle, tilt_min represents the tilt angle threshold, and angle_tilt represents the target tilt direction.

20. The non-transitory computer-readable storage medium of claim 15, wherein the target tilt direction is determined according to the following equation: angle_tilt=

$$\begin{cases} \arccos\left(\frac{\text{roll}}{\sqrt{\text{roll}^2 + \text{pitch}^2}}\right), & \text{pitch} > 0 \\ -\arccos\left(\frac{\text{roll}}{\sqrt{\text{roll}^2 + \text{pitch}^2}}\right), & \text{pitch} \le 0 \end{cases},$$

where angle_tilt represents the target tilt direction, pitch represents the pitch angle, and roll represents the roll angle.

* * * * *